United States Patent Office 3,115,475
Patented Dec. 24, 1963

3,115,475
PROCESS FOR THE PRODUCTION OF
STABILIZED POLYESTERS
Wolfgang Griehl, Chur, Graubunden, Switzerland, assignor to Inventa, A.G. fuer Forschung und Patentverwertung, Zurich, Switzerland
No Drawing. Filed Feb. 4, 1959, Ser. No. 791,029
Claims priority, application Switzerland Feb. 18, 1958
8 Claims. (Cl. 260—22)

This invention relates to a process for the manufacture of stabilized polyesters, i.e., of polyesters having a definite degree of polycondensation.

A given degree of polycondensation of products made from melted polyesters is a prerequisite. The degree should be corresponding to the intended end use of the resin. Experience has shown that it practically is impossible to attain a given degree of polycondensation since particularly the more important aromatic polyesters easily undergo thermal decomposition at the melt temperatures employed. Most of all, it is impossible to obtain polyesters of a preselected molecular weight because the melt viscosity during polycondensation cannot be accurately determined because of gas bubbles present in the melt and for other reasons.

Several methods have been proposed to regulate the degree of polycondensation of, e.g., polyterephthalic acid esters. Usually monofunctional alcohols or carboxylic acids and their esters have been suggested. In theory, these compounds can lead to the desired result. However, in practice, they are not applicable because the polycondensation process is unduly retarded by their presence. This, as has been found, is due to the fact that monofunctional alcohols or carboxylic acids form addition products with the catalysts used for the acceleration of the polycondensation and therefore render these catalysts ineffectual. For instance, the speed of the polycondensation reaction is decreased by more than one half by the addition of benzoic acid, its glycol ester or of o-alkylbenzoyl benzoic acid ester as a chain regulating agent. This entails that the thermal decomposition easily prevails over the ester interchange which is to occur. Other chain regulators, such as benzoic acid methyl ester or stearic acid methyl ester, are not effective because their ester interchange, as compared to the corresponding glycol esters, proceeds slowly. This, together with comparatively high volatility in vacuo, preclude a controlled progress of the polycondensation.

It now has been found unexpectedly and is the object of the instant invention that the described disadvantages are avoided when anhydrides of such monocarboxylic acids and their mixtures are used as stabilizers which have a comparatively high boiling point and, at the reaction temperatures employed, neither decompose nor undergo chemical changes and which, furthermore, exhibit as low as possible a constant of ester interchange. The latter requirement is of special importance because there practically are no usable carboxylic acids which at the temperatures (250–300° C.) and pressures (0.5–2 mm. Hg) employed are not somewhat fugitive. However, acids having a low constant of ester interchange (as compared to the dicarboxylic acids forming the polyester) are not liberated during the polycondensation process and, therefore, successfully block the chain ends to the desired extent. Particularly suitable are the anhydrides of stearic acid, palmitic acid and similar saturated straight-chain fatty acids having at least 10 carbon atoms, as well as the anhydrides of alkylsubstituted monocarbonic acids, e.g., p-toluic acid, α-methyl-β-naphthoic acid, ethyl naphthoic acid, etc.

As mentioned above, beside the moncarboxylic acid anhydrides mixed anhydrides can also be used. In that case it is opportune to have the second component derived from a volatile monocarboxylic acid, such as acetic acid, propionic acid or the like, which after addition distills in form of its corresponding acid. It is a matter of course that this must be considered in the measuring of the amount to be added to the reaction.

The stabilizers blocking the chain ends may be added to the starting materials. However, it is opportune to accomplish the addition only after the polycondensation has progressed beyond the beginning phase. It also is possible to add to the polycondensation reaction a prepared mixture consisting of a slightly condensed polyester and of stabilizer whereby the latter is calculated for the total polyester to be formed.

A most particular advantage of the stabilizers resides in the fact that they can be added to the reaction mixture even after the desired molecular weight of the polyester has been greatly exceeded. This is possible only on account of the strong reactivity of the anhydrides and should be carried out in only a slight vacuum. Finally, it should be pointed out that polyesters stabilized according to the present invention display a more favorable thermal behavior than polyesters not prepared according to this process. A decomposition of the terminal glycol radicals under splitting off of water cannot occur because all free terminal hydroxyl groups are taken up by acid radicals which do not easily split off. Hence, a subsequent saponification of the polyesters and steady formation of new decomposable end groups is effectively forestalled.

The invention now will be further explained by the following examples. However, it should be understood that these are given merely by way of illustration, not of limititation, and that numerous changes may be made in the details without departing from the spirit and the scope of the present invention as hereinafter claimed.

*Example 1*

194 g. terephthalic acid dimethyl ester are subjected to an ester interchange with 190 g. ethylene glycol in the presence of 0.2 g. lead acetate at 190° C. After distilling the methanol formed, the temperature gradually is raised to 250° and the excess ethylene glycol distilled. The remainder is an oligomeric polyester having an average degree of polycondensation of 10. 5.5 g. stearic acid anhydride are added thereto, and after a short dwelling time the heating is continued at 280° C. under a vacuum of 1 mm. Hg. After approximately 4 hours, the melt viscosity does no longer increase, and a polyester having an average molecular weight of 20,000 thus is obtained.

*Example 2*

166 g. terephthalic acid and 200 g. anhydrous ethylene glycol are refluxed, and terephthalic acid diglycol ester is thereby obtained. The excess ethylene glycol is distilled, 0.2 g. antimony acetate are added, and the temperature gradually is raised to 250° C. A vacuum then is applied, and the temperature raised to 280° C. This temperature is maintained for 5 hours at a vacuum of 0.5 mm. Hg. After that, the melt has a viscosity corresponding approximately to a degree of polycondensation of 120. 3.56 g. of mixed anhydrides of p-toluic acid and acetic acid then are added, the mixture is strongly agitated for approximately 10 minutes at a vacuum of 600 mm. Hg, and heating at 280° C. at a vacuum of 0.5 mm. Hg then is continued for another 30 minutes. The product thus obtained has a degree of polycondensation of approximately 100. This degree of polycondensation does not substantially change even after many hours of continued heating. The condensate can be spun into fibers directly from the melt without showing differences in the degree of polycondensation and physical behavior between the material spun at the beginning and that at the end.

*Example 3*

190 g. pure vanillic acid-oxethyl ether are heated in the presence of 0.2 g. boric acid for 5 hours at 250° C. in a vacuum of 20 mm. Hg. Then 5.64 g. of the mixed anhydride of benzoylbenzoic acid and propionic acid are added, the heat increased to 280° and thus vacuum lowered to 0.5 mm. Hg. Heating under these conditions is continued for 8 hours with strong agitation. After that, the polyester formed has a degree of polycondensation of approximately 80 which does not change even after heating for many hours in high vacuum.

I claim as my invention:

1. In a process for the production of linear polyesters selected from the group consisting of glycol esters of terephthalic acid and vanillic acid oxethyl ethers by polycondensation, the steps which comprise:
   (a) carrying out the polycondensation in the presence of catalysts selected from the group consisting of lead acetate, antimony acetate and boric acid; and
   (b) stabilizing said polyesters and maintaining a given degree of polycondensation by adding monocarboxylic anhydrides in amounts ranging from 0.1 to 2.0 mol percent, calculated on the acids present in said polyesters, prior to the termination of said polycondensation.

2. The process according to claim 1, wherein anhydrides of straight-chain saturated carboxylic acids having at least 10 carbon atoms are added to said reaction mixture.

3. The process according to claim 2, wherein said anhydride is stearic acid anhydride.

4. The process according to claim 1, wherein mixed anhydrides are added to said reaction mixture.

5. The process according to claim 4, wherein one acid radical of said mixed anhydrides derives from an acid boiling below 200° C.

6. The process according to claim 5, wherein said acid boiling below 200° C. is acetic acid.

7. In a process for the production of linear polyesters selected from the group consisting of glycol esters of terephthalic acid and vanillic acid oxethyl ethers by polycondensation, the steps which comprise:
   (a) carrying out the polycondensation in the presence of catalysts selected from the group consisting of lead acetate, antimony acetate and boric acid; and
   (b) stabilizing said polyesters and maintaining a given degree of polycondensation by adding monocarboxylic acid anhydrides having a boiling point above 250° C. in amounts ranging from 0.1 to 2.0 mol percent, calculated on the acids present in said polyesters, prior to the termination of said polycondensation.

8. Linear polyesters having predetermined degrees of polycondensation selected from the group consisting of terephthalic acid ethyleneglycol ether and vanillic acid oxethyl ether containing 0.1 to 2.0 mol percent, calculated on said acids, of monocarboxylic acid anhydrides having a boiling point above 250° C., produced in the presence of catalysts selected from the group consisting of lead acetate, antimony acetate and boric acid.

References Cited in the file of this patent

UNITED STATES PATENTS

| | | |
|---|---|---|
| 2,028,908 | Hoffman | Jan. 28, 1936 |
| 2,618,616 | Tess et al. | Nov. 18, 1952 |
| 2,630,454 | Bock | Mar. 3, 1953 |
| 2,806,057 | Finch et al. | Sept. 10, 1957 |
| 2,894,934 | Burkhard | July 14, 1959 |
| 2,915,486 | Shelley | Dec. 1, 1959 |
| 2,951,827 | Siggel | Sept. 6, 1960 |

FOREIGN PATENTS

| | | |
|---|---|---|
| 610,138 | Great Britain | Oct. 12, 1948 |
| 505,337 | Canada | Aug. 24, 1954 |